United States Patent

Handley

[11] Patent Number: 6,006,240
[45] Date of Patent: Dec. 21, 1999

[54] CELL IDENTIFICATION IN TABLE ANALYSIS

[75] Inventor: John C. Handley, Fairport, N.Y.

[73] Assignee: Xerox Corporation, Stamford, Conn.

[21] Appl. No.: 08/828,847

[22] Filed: Mar. 31, 1997

[51] Int. Cl.[6] .................................................... G06F 17/30
[52] U.S. Cl. ........................ 707/510; 707/509; 707/500
[58] Field of Search .................... 707/510, 504, 707/503, 509, 500; 382/173

[56] References Cited

U.S. PATENT DOCUMENTS

| | | | |
|---|---|---|---|
| 4,953,108 | 8/1990 | Kata et al. | 707/509 |
| 5,048,107 | 9/1991 | Tachikawa | 382/173 |
| 5,420,695 | 5/1995 | Ohta | 358/462 |
| 5,425,138 | 6/1995 | Kumakawa | 395/148 |
| 5,485,566 | 1/1996 | Rahgozar | 707/509 |
| 5,502,777 | 3/1996 | Ikemure | 382/173 |
| 5,768,158 | 6/1998 | Adler et al. | 364/578 |
| 5,832,532 | 11/1998 | Kennedy et al. | 707/503 |
| 5,880,742 | 3/1999 | Rao et al. | 707/503 |
| 5,881,381 | 3/1999 | Yamashita et al. | 707/509 |
| 5,893,123 | 4/1999 | Tuinenga | 707/504 |

OTHER PUBLICATIONS

"Table Structure Recognition based on Textblock Arrangement and Ruled Line Position", presented at the IEEE Second International Conference on Document Analysis and Recognition, Tsukuka, Japan, Oct. 1993, by Itonori.

"Recognition of Tables Using Table Grammars", by green and Krishnamoothy at the Forth Annual Symposium on Document Analysis and Information retreval, in Las Vegas, Nevada, USA, Apr. 1995.

"Using Natural Languages Processing for Identifying and Interpreting Tables in Plain Text," by Douglas et al., Forth Annual Symposium on Document Analysis and Information Retrieval in Las Vegas, Nevada, Apr. 1995.

"Robust Table–form Structure Analysis based on Box–Driven Reasoning," by Hori and Doermann, Center for Automation Reseaerch, University of Maryland.

"Method for Table Structure Analysis Using DP Matching", by Hirayama, IEE Proceedings of the Third International Conference on Document Analysis and Recognition, Montreal, Canada, vol. II, pp. 583–585, Aug. 1995.

"A graph–based table recognition system", by Rahgozar and Cooperman, SPIE vol. 2660, pp. 192–203, Apr. 1996.

*Primary Examiner*—Anton W. Fetting
*Assistant Examiner*—Greta L. Robinson
*Attorney, Agent, or Firm*—L. M. Oritz; P. E. Blair

[57] ABSTRACT

The present invention handles fully-lined, semi-lined and line-less cell tables by identifying the cells and cell separators during page recomposition processes as part of optical character recognition processes. The invention accomplishes such by iteratively identifying cell separators and cells. The processes accomplishes this by iteratively merging word boxes into cells, iteratively finding separators, and iteratively merging cells bounded by the same separators, and repeating these steps until the correct cell structure is found. With this method, rows are estimated, close words are merged into cells, columns are then estimated, cells within columns are merged, columns re-estimated, cells in the same row and column are merged into bigger cells, and then rows and cells are merged according to the detection of various table styles. This invention handles large complex tables with multiple lines of symbols per cell. This method handles multiple line cells in lined, semi-lined and line-less tables.

9 Claims, 10 Drawing Sheets

| TYPE FACE | FONT No.(P/L) | | POINT | PITCH | PRINT SAMPLE |
|---|---|---|---|---|---|
| Helve | 14 | 33 | 6 | PS | abcdeABCDE0123456789 |
| Helve Italic | 58 | — | 6 | PS | *abcdeABCDE0123456789* |
| Helve Bold | 59 | 75 | 6 | PS | abcdeABCDE0123456789 |
| Helve Italic Bold | 60 | — | 6 | PS | *abcdeABCDE0123456789* |
| Line Printer | 15 | 34 | 9 | 16.6 | abcdeABCDE0123456789 |
| Line Printer Italic | 61 | 35 | 9 | 16.6 | *abcdeABCDE0123456789* |
| Line Printer Bold | 62 | 76 | 9 | 16.6 | abcdeABCDE0123456789 |
| Line Prntr Italic Bold | 63 | 77 | 9 | 16.6 | *abcdeABCDE0123456789* |
| Line Printer | 16 | 36 | 6 | 21.4 | abcdeABCDE0123456789 |
| Line Printer Italic | 64 | — | 6 | 21.4 | *abcdeABCDE0123456789* |
| Line Printer Bold | 65 | 78 | 6 | 21.4 | abcdeABCDE0123456789 |
| Line Prntr Italic Bold | 66 | — | 6 | 21.4 | *abcdeABCDE0123456789* |

*FIG. 1*

| Sector | Electricity sales 1985 (GWH) | Efficiency factor | Efficiency Sales | Savings |
|---|---|---|---|---|
| Residential | 31929 | 0.62 | 19659 | 12270 |
| Commercial | 29357 | 0.49 | 14307 | 15050 |
| Industrial | 25156 | 0.81 | 20463 | 4693 |
| Streetlighting | 794 | 0.70 | 556 | 238 |
| Other | 1101 | 0.63 | 693 | 408 |
| Totals | 88337 | | 55678 | 32659 |

| Option | What the Option Does |
|---|---|
| -O | Requests level 2 optimization for the file being compiled. |
| +O1 | Requests level 1 optimization for the file being compiled. |
| +O2 | Requests level 2 optimization for the file being compiled. |
| +O3 | Requests level 3 optimization for the file being compiled. *Level 3 optimization is currently only supported on Series 300 and 400 systems.* |
| +Ov | Requests level 2 optimization for the file being compiled and ensures that no global memory references are optimized away. The effect is as if all global variables were declared with the keyword volatile. |

| AAAA | DDDD EEEE | GGGG |
|---|---|---|
| BBBB | | HHHH |
| CCCC | FFFF | IIII JJJJ |

FIG. 8

| Option | What the Option Does |
|---|---|
| +O0 | Requests level 2 optimization for the file being compiled. |
| +O1 | Requests level 1 optimization for the file being compiled. |
| +O2 | Requests level 2 optimization for the file being compiled. |
| +O3 | Requests level 3 optimization for the file being compiled. Level 3 optimization is currently only supported on Series 300 and 400 systems. |
| +Ov | Requests level 2 optimization for the file being compiled and ensures that no global memory references are optimized away. The effect is as if all global variables were declared with the keyword volatile. |

| TYPE FACE | | FONT No.(P/L) | | POINT | PITCH | PRINT SAMPLE |
|---|---|---|---|---|---|---|
| Helve | | 14 | 33 | 6 | PS | abcdeABCDE0123456789 |
| Helve | Italic | 58 | — | 6 | PS | abcdeABCDE0123456789 |
| Helve | Bold | 59 | 75 | 6 | PS | abcdeABCDE0123456789 |
| Helve | Italic Bold | 60 | — | 6 | PS | |
| Line Printer | | 15 | 34 | 9 | 16.6 | abcdeABCDE0123456789 |
| Line Printer | Italic | 61 | 35 | 9 | 16.6 | abcdeABCDE0123456789 |
| Line Printer | Bold | 62 | 76 | 9 | 16.6 | abcdeABCDE0123456789 |
| Line Prntr | Italic Bold | 63 | 77 | 9 | 16.6 | abcdeABCDE0123456789 |
| Line Printer | | 16 | 36 | 6 | 21.4 | abcdeABCDE0123456789 |
| Line Printer | Italic | 64 | — | 6 | 21.4 | abcdeABCDE0123456789 |
| Line Printer | Bold | 65 | 78 | 6 | 21.4 | abcdeABCDE0123456789 |
| Line Prntr | Italic Bold | 66 | — | 6 | 21.4 | abcdeABCDE0123456789 |

*FIG. 9*

| (in thousands) | Capital Leases | Operating Leases |
|---|---|---|
| 1987 | $1,316 | $ 25,410 |
| 1988 | 883 | 26,053 |
| 1989 | 875 | 24,090 |
| 1990 | 875 | 17,919 |
| 1991 | — | 16,147 |
| Future years | — | 68,221 |
| Total minimum lease payments | $3,949 | $177,840 |
| Less amounts representing interest | 864 | |
| Present value of minimum lease payments | $3,085 | |

FIG. 10

| (in 1h~c~~~d) | Capital Leases | Operating Leases |
|---|---|---|
| 1987 | $1,316 | $ 25,410 |
| 1988 | 883 | 26,053 |
| 1989 | 875 | 24,090 |
| 1990 | 875 | 17,919 |
| 1991 | | 16,147 |
| Future years | | 68,221 |
| Total minimum lease payments | $3,949 | $177,840 |
| Less amounts representing interest | 864 | |
| Present value of minimum lease payments | $3,085 | |

*FIG. 11*

CELL IDENTIFICATION IN TABLE ANALYSIS

FIELD OF THE INVENTION

The present invention generally relates to table region identification methods and, more particularly, the invention is related to cell tables within document images and a method and system of determining the cells of tables in document images during scanning processes using character recognition techniques.

BACKGROUND OF THE INVENTION

Recomposition methods for optical character recognition (OCR) products, in the look and feel of the original document is preserved in a word processor file format, are increasingly popular features. Leading OCR technologies are highly regarded for recomposition facilities; however, the analysis and output of cell structures for semi-ruled (semi-lined) and un-ruled (line-less) tables with a cell or cells having multiple lines of text is lacking in the art.

Table analysis is the task of converting an image of a table in a document to a marked-up electronic version suitable for conversion to a word processor format such as Microsoft Word®. A table is either found automatically, or identified by a user with a graphical user interface by selecting a table from an image displayed on a computer monitor. In either case, the system is supplied with the word bounding boxes and horizontal and vertical rulings and must recompose the table cells using only this geometric information, i.e., no character information need be available.

A cell is a list of one or more words comprising a logical entity in a table. Cells are delimited by rulings, gutters or leading (the last two words meaning white space in typography jargon). The words in a cell are in close proximity relative to the words in another cell. Methods to extract all necessary geometric information about the table region as well as the page on which it occurs are known in the art. The analysis process yields information describing the cells and table which consists of a list of unique word identifiers, the coordinates of the cell bounding box on the page, and indicators for left, right, top and bottom borders as to whether there are rulings to be drawn in the output or are invisible.

There are three types of tables: line-less, semi-lined and lined. FIG. 1 shows a line-less table. Logical quantities are grouped into cells forming rows and columns. FIG. 2 shows a semi-lined table. These may be somewhat easier to detect automatically given the long horizontal rulings. FIG. 3 shows a lined table. These are reliably detected automatically in commercially available TextBridge® software from Xerox Corporation, and is also described in U.S. Pat. No. 5,048,107 to M. Tachikawa entitled "Table Region Identification Method." FIG. 4 shows word bounding box information used to recover the table cell structure in FIG. 1.

The table identification method of Tachikawa is essentially a means of extracting runlengths, combining them into connected components and extracting large connected components as table candidates. Among these candidate regions, horizontal rulings are extracted by combining runlengths longer than some specified threshold and collecting those with length approximately the width of the connected component. If the number of rulings is greater than some threshold, the region is deemed a table. This procedure find only ruled tables. The chief advantage of this method appears to be speed and the ability to work with runlength compressed data, but this method can only find fully-lined tables.

In a paper by Itonori entitled "Table Structure Recognition based on Textblock Arrangement and Ruled Line Position", presented at the IEEE Second International Conference on Document Analysis and Recognition, Tsukuka, Japan, October 1993, a method of recognizing table structures from document images is disclosed. In Itonori, each cell of a table is arranged regularly in two dimensions and is represented by a row, column pair. The Itonori process expands cell bounding boxes and assigns new rows and column numbers to each edge. Itonori finds columns and rows using projections of character bounding boxes.

The table identification method of Green and Krishnamoothy, disclosed in a paper entitled "Recognition of Tables Using Table Grammars", presented at the Forth Annual Symposium on Document Analysis and Information Retrieval, in Las Vegas, Nev., USA, April 1995, identifies runlengths and page margins via a lexical analyzer that quantizes the proportion of black pixels in a scantine observation window. The lexical analyzer produces eight different tokens than are passed to a parser. Scanning can be done horizontally or vertically. The outcome is a set of vertical and horizontal rulings that are then used for table analysis. This analysis extends all rulings to the edges of the table, partitioning the table into elementary cells. Further analysis joins those cells which were not originally separated by a ruling. The result is as set of image regions corresponding to cells plus rulings. The method uses a grammar-based approach to identify the rulings and cells of a fully-lined table image. Recognition depends on having an explicit table model expressed as a grammar. This method does not handle fully-lined, semi-lined or line-less tables without recourse to an explicit table model, which must be created by a user. This method accesses the image pixels. Moreover, exploring all the parsing possibilities requires several seconds on a parallel computer.

The method of Douglas et al., disclosed in a paper entitled "Using Natural Languages Processing for Identifying and Interpreting Tables in Plain Text," also presented at the Fourth Annual Symposium on Document Analysis and Information Retrieval, in Las Vegas, Nev., USA, Apr. 26, 1995, uses natural language processing notions to represent and analyze tables. This process attempts to characterize the information contained within a table, regardless of its form. Several table transformations are listed with respect to which table information is invariant. Douglas et al. posit a canonical representation for tabular information. Douglas et al. process a particular class of well-structured tables, and their application is the interpretation of tabular information in the construction industry. There is a list of domain labels that appears a column headings in the canonical representation and a list of n-tuples of values, where n is the number of columns. The left-most column plays a special role as a place for high-precedence domain labels and values. Finding cells proceeds as follows. The data at hand are lines consisting of character bounding boxes and spaces between characters. Characters may be alphanumeric or otherwise, but a tag is kept to identify alphanumeric characters. A sequence of characters is content-bearing if it contains at least one alphanumeric character. Column breaks are determined by intersecting vertically overlapping lines. The spaces that survive intersection of all such lines are deemed gaps between columns. Whether or not the columns of those of a table (rather than columns of text) is determined through a set of rules that use alphanumeric density and column with relative to the with of the text body being analyzed. Within a column, adjacent lines are merged into cells. Once the cells have been determined and labeled with their unique column/ row coordinates, the table is analyzed semantically using recognized characters. Domain knowledge (e.g., construction materials) is used to establish whether a phase is a domain label or a domain value and whether, based upon the cell's horizontal coordinate, a cell's semantic type is consisted with others in its column. This method is only intended for a specialized fully-lined table style used in the construction industry. Character information is needed in this method. This process does not try to identify the table structure as cells and separators independent of content or style.

In U.S. Pat. No. 5,502,777 to Ikemure, a means to determine whether a ruled area is a table or a figure is provided. The method compares the number of pixels comprising the horizontal and vertical rules in the region to the total number of black pixels in a binarized image. If the ratio is sufficiently large, a significant proportion of the pixels belong to rulings and thus the region is a table.

In a paper by Hori and Doermann entitled "Robust Table-form Structure Analysis based on Box-Driven Reasoning", prepared for the Document Processing Group, Center for Automation Research, University of Maryland, a method is disclosed for analyzing table-form documents which are full-lined. The task is to find all the cells, by which they mean the rectangles that are formed by the rulings and enclose strings of text. Their contribution is the ability to handle degraded documents where characters can overlap rulings. The algorithm operates on two versions of the binary image, one at the original scanned resolution and a reduced resolution obtained by summing over a small square moving window, thresholding and subsampling. In the reduced image, a pixel is black if any pixel in a square region about the corresponding pixel in the original is black. This has the effect of merging broken or dotted rulings; however, it introduces the problem of characters overlapping with lines of the form. Inner and outer boxes are obtained for the image. The boxes are then classified according to their size and aspect ratio into one of character, cell, table, bar, noise, character hole, and white character island. Some of these correspond to inner boxes (they bound white space) and outer boxes (bounding a connected component) or both. Inner boxes can be nested in out boxes and vice-versa. Box coordinates for the original and reduced resolution images are maintained. Cells are inner boxes and have outer boxes of strings nested inside. Boxes in the original are inspected for characters touching lines, and if so, they are separated. The boxes in the reduced image are more reliable in the sense that they are formed with broken and dotted lines rendered as solid lines. But they are also more likely to have touching characters. Boxes in the reduced and original images are compared and their differences reconciled. Strings are characters that are nested within the same cell. Character boxes are collected into lines of text. Since the cell coordinates do not match precisely the positions of the rulings, adjustments are made to line up the cells and their neighbors with rulings to avoid gaps and allow spaces for rulings to be drawn between the cells. The result is a collection of bounding boxes corresponding to an ideal version of the scanned table-form.

In U.S. Pat. No. 5,420,695 to Ohta, a method is disclosed which allows a user to edit a table by entering new column and row sizes on a digital input pad on a copier. This process must recognize a table and perform the proper "corrections" for output. Table detection uses inner and outer contours of binary images to determine the location of tables and cells within them. Once the cells have been identified, new rows or columns can be added or deleted per the users instruction. The intent is to provide a table-editing mechanism through a photocopier. If the table is semi-lined, simple cells are identified through histogram techniques using vertical and horizontal projection profiles. This method of inner and outer contour manipulation bears a similarity to the method of Hori and Doermann.

In a paper by Hirayama entitled "A Method for Table Structure Analysis Using DP Matching", presented at the IEEE Proceedings of the Third International Conference on Document Analysis and Recognition, Montreal, Canada, Vol. II, pages 583–586, Aug. 14–16, 1995, a method that detects and analyzes tables which have vertical and horizontal rulings is disclosed. The first task is to segment a binary document image into regions containing text, tables and figures. The first step in segmentation is to find the connected components of the runlength-smeared document image. Bounding boxes of the connected components are classified as vertical or horizontal lines, character strings or other objects according to their heights. Character strings are grouped together to form text regions. The remaining regions are non-text: tables or figures. Tables are required to have horizontal and vertical lines. Lines are grouped together when they intersect, are close and parallel, or their endpoints are close. The regions containing a group of linked lines are called table area candidates. A bounding box of rulings is added to the table region in case some cells are open. Within a table area candidate, all rulings are extended by virtual lines to terminate into the most extreme ruling. The table area is thus segmented into a "lattice" being composed of a grid of rectangles. Next, rectangles that are separated only by virtual lines are joined. The resultant polygons form cells if they are rectangular and enclose only character strings or are empty. Some polygons correspond to cells and others not, but the region as a whole is judged to be a table area if there is at least one non-empty cell and non-cell areas constitute a fraction of the total candidate area. Now in the lattice version of the table, there is a grid of m columns and n rows. The separators between these may be virtual. It is necessary to assign these virtual cells to proper table rows by aligning columns. Alignment is done pairwise from left to right using the well- known string-to-string correction dynamic programming algorithm where the weights for the substitution cost are distances in baselines between two text strings and there is a fixed insertion and deletion cost. For example, in FIG. 5 there are three columns and six virtual rows. With the deletion and insertion cost sufficiently low, the alignment algorithm matches string AAAA with DDDD and CCCC with FFFF in the first two columns. The string BBBB is "deleted" and string EEEE is "inserted." A new row is supplied to match BBBB. Continuing to columns two and three, the string HHHH doesn't have a match in the second column, so the algorithm searches the previous columns from right to left for a match. If none is found, a new row is supplied. The result in this example is that six rows are found.

U.S. Pat. No. 5,485,566 to Rahgozar discloses an algorithm for finding the columns of a tabular structure using only word bounding box information. The method uses intervals between word bounding boxes to estimate column breaks. Only the x coordinates are used. Starting with all the gaps in a tabular region of a document, all possible intersections are taken. This collection of intervals and their intersections (not including the null set) is called the closure. Each member of the closure has a rank, the number of original gaps it is a subset of. The members of the close which are small in some sense and have the highest rank form column breaks. Presumably, this method can be used for rows as well, but not for detecting the rows of a table with multiple line cells In a paper by Rahgozar and Cooperman entitled "A graph-based table recognition system", SPIE Vol. 2660, pages 192–203, April 1996, it is disclosed that a graph rewriting techniques can be brought to bear on table identification and analysis. Graph grammars naturally describe notions of relative placement or alignment of cells. A table is a graph on cells and headings in a suitably chosen graph language. Table identification is the task of starting at a cell and choosing rewrite rules in advance until no more rules can be found. The result is a table since it is a sequence of productions from a start symbol. The sequence of productions produces information about the table structure, namely columns and rows. Rows can be found first by looking left and right for cells to merge.

Although prior art has progressed in the table recognition art, none of the prior art addresses the problem of identifying cells and cell separators in a manner that can handle multiple line cells and complex tables, such as tables containing substantial "white space". The art has not succeeded in accurately recognizing fully-lined, semi-lined and line-less cell tables. The art has can not handle multiple line cells in semi-lined and line-less table form. The prior art does not iteratively and carefully merge word boxes into cells, find separators, merge cells bounded by the same separators, update separators, and repeat these steps until the correct cell structure is found. It is therefore an object of this invention to provide a method of identifying cells and cell separators accurately during page recomposition processes that will overcome the short comings of the prior art it.

All of the references cited herein are incorporated by reference for their teachings.

SUMMARY OF THE INVENTION

In order to achieve the foregoing and other objects, and to overcome the shortcomings discussed above the present method for cell identification in table analysis is presented. The present invention handles fully-lined, semi-lined and line-less cell tables by identifying the cells and cell separators during page recomposition processes as part of the optical character recognition process. The invention accomplishes such by iteratively identifying cells and cell separators. The processes accomplishes this by:

i) iteratively merging word boxes into cells, ii) iteratively finding cell separators, and iii) iteratively merging cells bounded by the same cell separators, and repeating these steps until the correct cell structure is found. This method is effective irrespective of the presence of line rulings.

During the described method, a table region is selected by the system or found through some automatic procedure. Word bounding boxes (word boxes) and rulings are found through a page segmentation method. These word boxes will be collected into cells with frames using the present invention. Initially, there is a cell for each word bounding box and no cell has an assigned row or column. The word boxes are successively grouped into cells. Since the final output is a collection of cells with their frames and contained word bounding boxes, the data structure for a cell consists of a list of word bounding boxes, frame coordinates, and coordinates of its column and row.

If the table is fully lined, the cell structure is determined by merging cells that share closest rulings up, below, to the left and right. To detect this condition, the list of cells and their word bounding boxes are scanned through and it is noted whether or not there is a ruling above it, below it, to the left and to the right. If every word bounding box has rulings above, below, to the left and right of it and there are at least two columns, it is concluded that the table is fully lined and use the rulings as delimiters of the cells—that is, a cell frame is calculated as the closest x and y coordinates of rulings in each of the four directions. Finally, word boxes with identical frames are merged together so that the final cell with a given frame has all the word bounding boxes of all the cells with that frame. The result is a cell with the word bounding boxes for each cell in the table image and the cell frame coordinates match up closely with those of the original image. If the table is so detected as fully lined, the cell information is output and the process terminates.

If the table is not fully lined, the rows of the table are found using a histogram. Each word bounding box is projected against the vertical axis. Thus the count at coordinate y is the tally of the number of word bounding boxes whose vertical extent overlaps the coordinate. Horizontal ruling information is used as well. For each horizontal ruling, the histogram is set to zero at the rulings' y-coordinate. The resultant histogram displays peaks and valleys corresponding to rows and gutters. If the count of the histogram at a coordinate y is 0 or 1, we conclude that there is no row there, and there is a row otherwise. A list of intervals is calculated showing where the histogram exceeds 1. These intervals, in y-coordinates, form the first estimate of the row structure.

The next step is to merge cells that are close horizontally. Since we want to determine column structure with a similar histogram procedure soon, we do not want to produce spurious columns. Thus, we merge cells that overlap significantly in the vertical direction and are close horizontally.

A first estimate of the columns is made by projecting the cells vertically onto a horizontal axis. The procedure is similar to that for rows with a modification. In the row-finding procedure, each cell was tallied as one. Here, the word bounding boxes are weighted according to their height in the table. If a cell top is near the top of the table, it is counted as one, but otherwise it is counted as two. This is because cells at the top might be headers and span columns. As with rows, vertical rulings automatically delimit columns, whether they extend the height of the table or not. A list of intervals showing where the histogram exceeds one is calculated. Sometimes spurious columns are produced. To correct that, close columns are merged, but not across a vertical ruling.

Each row has starting and ending y-coordinates. Each column has starting and ending x-coordinates. Cells are assigned rows and columns if cell overlaps significantly with a row or column, respectively. If a cell overlaps with more than one row or column, it is assigned the one with the maximum overlap. Cells sharing the same row and column assignments are merged. Merging always uses ruling information. Under no circumstances are cells merged that are separated by rules.

In the case of semi-lined and line-less tables, some cell structure must be inferred from the style of the table. If each column has a cell in the second row, but not every column has a cell entry in the first row, merge every cell in the first row that is not a header with the cell in the same column in the second row. Next, often tables have labels in the first column. If a row is not the first row and does not have a cell in the first, merge that row to the closest one above it, taking care to never combine cells or rows across rulings. Finally, if a cell in the first column has no other cells in its row, merge that cell to the one below it.

Rows are re-estimated using these final cell estimates using the histogram method described previously. However at this stage all the small word bounding boxes have been merged into larger cells. Thus rows correspond to intervals where the histogram is positive, rather than greater than one as before.

A table frame is needed for the final table structure. This is simply the smallest bounding box containing all the cells and rulings found so far. The exact coordinates are found of the separators formed by white space. These separators are the white space between rows and columns. The midpoint of gaps between columns are converted to vertical separators and likewise for rows. The entire collection of rulings is processed to estimate the final vertical and horizontal separators. If vertical two rulings or two separators are close together horizontally and they overlap vertically, then they are combined. If one was found as a true ruling from the page information interface and the other is from a column gap, the true ruling is considered primary and is retained, and the other ruling is removed from the separator list. If two rulings are both true rulings, their x-coordinates are averaged, and the resultant ruling has vertical extent the maximum of the two. Horizontal separators are estimated similarly. The table structure is thus established as the table frame and the list of cells with their closest separators. Rules are utilized to merge adjacent rows when appropriate for popular table styles.

Tables such as the one in FIG. 10 of the IP cannot be handled by the prior art. This invention has the advantage of being able to handle multiple line cells in semi-lined and line-less tables.

Other objects, advantages, and salient features of the invention will become apparent from the detailed description which, taken in conjunction with the drawings, disclose the preferred embodiments of the invention.

DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

FIG. 1 is an illustration of a line-less table.

FIG. 2 is an illustration of a semi-lined table.

FIG. 3 is an illustration of a lined table.

FIG. 8 illustrates results for the fully-lined table in FIG. 3.

FIG. 9 illustrates the result of the cell identification on the table in FIG. 1.

FIG. 10 illustrates a table from a financial report that was cropped out by hand.

FIG. 11 illustrates recomposition analysis results from the table in FIG. 10.

DETAILED DESCRIPTION OF THE INVENTION

The present invention handles fully-lined, semi-lined and line-less cell tables by identifying the cells and cell separators during page recomposition processes as part of the optical character recognition processes. The invention accomplishes such by iteratively identifying separators and cells—by iteratively and carefully merging word boxes into cells, finding separators, merging cells bounded by the same separators, updating the separators, and repeating these steps until the correct cell structure is found.

Figure 4:
FIG. 4 illustrates word bounding box information used to recover the table cell structure in FIG. 1.
Figures 5, 6:
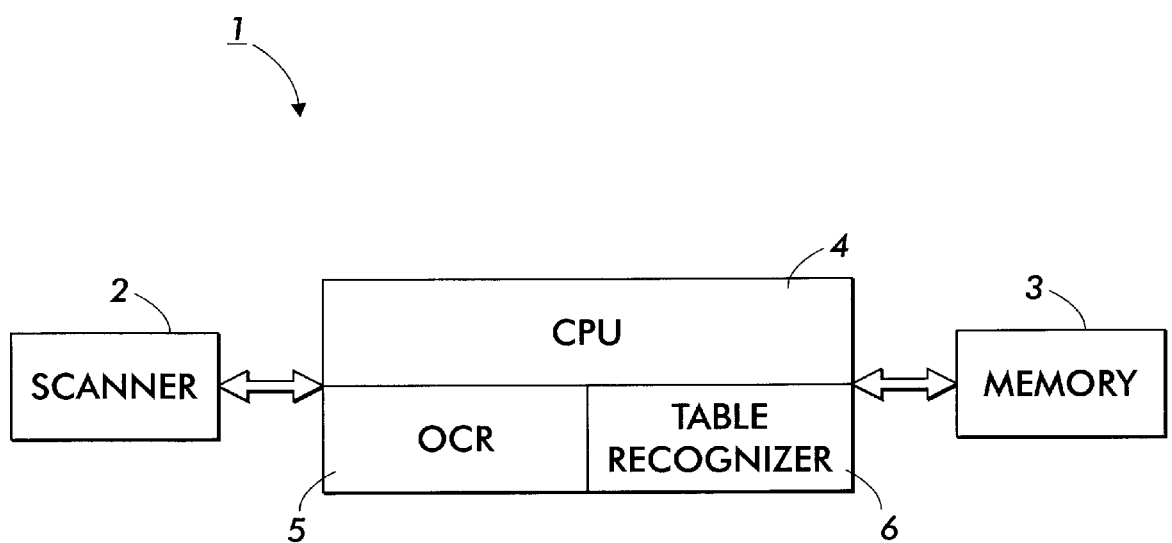
FIG. 5 is an illustration of a lined table having three columns and six virtual rows.
FIG. 6 is a block diagram of the system for the present invention.

Referring to FIG. 6, a block diagram of a system 1 used for this invention is disclosed. During initial steps of table recognition, a image (page) containing a table is scanned by optical character recognition hardware 2 known in the art. The table, now in the computer memory 3 is then processed by the microprocessor 4 using optical character recognition software 5 and table recognition methods 6 by (1) identifying the scanned table/image's table region (location that the image will be located on the page image) through automatic methods or graphical user interfaces (also known in the art), and, using the table recognizer 6 of the invention in parallel, (2) converting the image into word boxes and rulings (rulings are long, horizontal or vertical lines that may serve as cell separators). Automatic methods are generally used for fully-lined tables or images, while graphical user interfaces are used for semi-lined and line-less tables (the problem is in the identification of table cells and their separators where distinct rulings are nonexistent). The next phase of the method is to properly identify the separators based on existent rulings or the more difficult to identify "white space".

Figure 7:
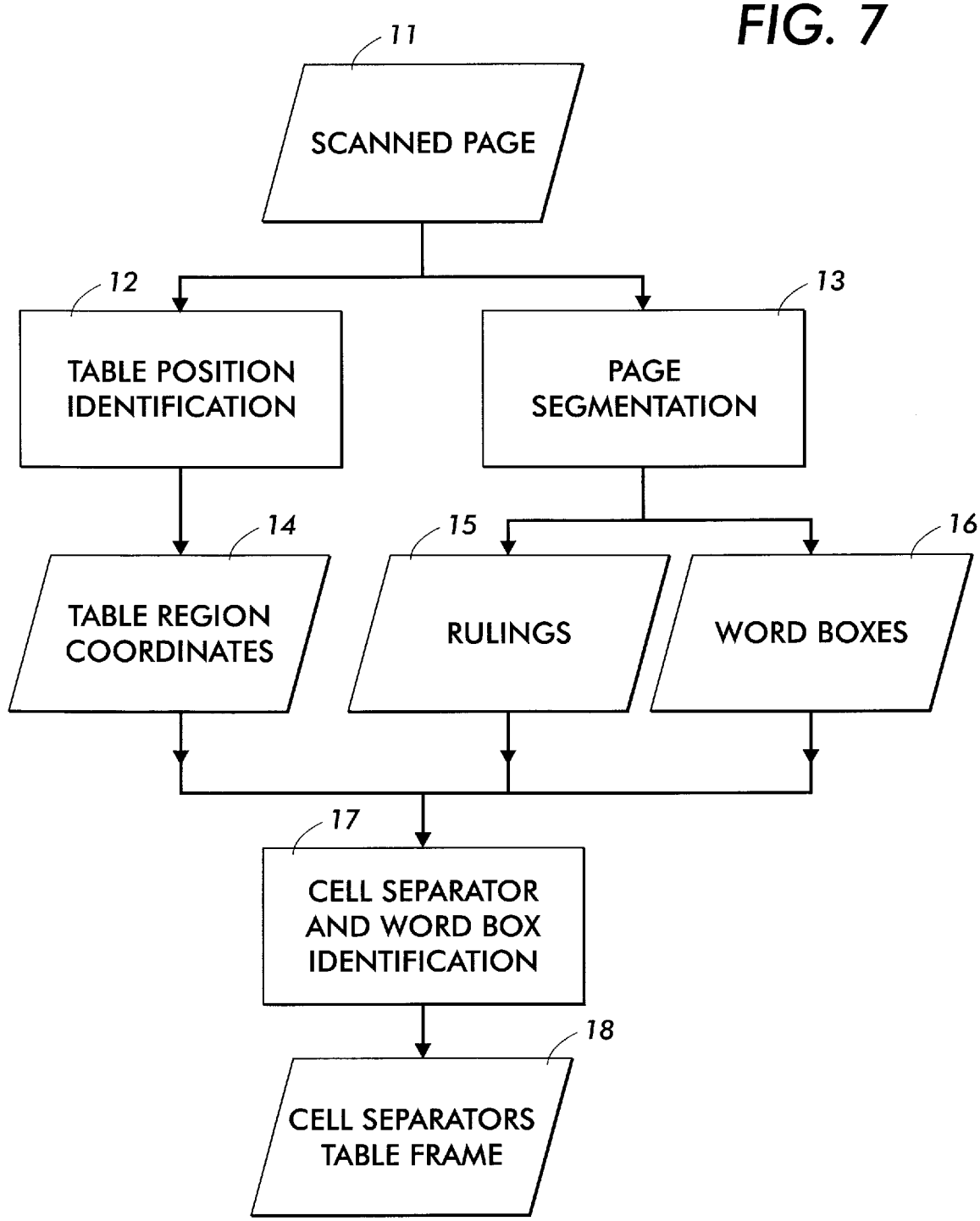
FIG. 7 is a flow diagram of the process for the present invention.

Referring to FIG. 7, a general flow diagram for the following detailed steps of the method is presented. It should be noted that the majority of the following process occurs within the cell separator and word box identification 17 portion of the flow diagram. The method of the invention is accomplished as follows:

Step 1. From the scanned page 11, obtain all the word bounding boxes 16 in the region 12 selected as a table by the user or found through some automatic procedure such as page segmentation 13. Each word bound box has a unique numeric identifier (word id). These word bounding boxes will be collected into cells with frames using methods described herein since the final output is a collection of cells with their frames and containing word bounding boxes, the data structure for a cell consists of a pointer to a linked list of word bounding boxes, frame coordinates, and coordinates of its column and row. Initially, there is a cell for each word bounding box and no cell has an assigned row or column. Skew correction is done using a skew estimate which is then used to determine a y-offset for each y-coordinate to correct its skew. The correction assumes a small angle so that tan z is approximately z.

Step 2. After page segmentation 13 procedures, obtain all the rulings 15 contained in the table. Ruling information is available for the entire page, but not explicitly for the table at hand. To obtain only relevant rulings, the frame of the table is first estimated 17 by taking the maxima and minima of the x and y coordinates of all the word bounding boxes in the cell list so far found within the table region coordinates 14 identified after table position identification 12. Next we iterate 17 through the list of rulings. If a ruling, either horizontal or vertical, intersects the estimated frame and is not deemed to be an underline, it is stored in a linked list of rulings. An horizontal ruling is considered an underline if it is less than 2 cm long, overlaps the bottom edge of a word and is within 12.8 mm of the bottom. There are separate lists for horizontal and vertical rulings. The page rulings iterator is again scanned 17 to look for any rulings not in the lists nor an underline, but which intersects any rulings in the lists. If a ruling intersects a ruling in either list, it is added to its appropriate list. This procedure, which must terminate because the page ruling list is finite, is repeated until no more rulings are added. The resultant list is all the rulings on the page that intersect the estimated frame or are connected to an intersecting ruling. The final step is to combine rulings that are close together and stitch rulings together whose end points are close. This must be done because we are provided rulings that may be broken or redundant.

Step 3. Determine whether a table is fully lined 17. To detect whether a table is fully lined, the list of cells and their word bounding boxes is scanned and it is noted whether or not there is a ruling above it, below it, to the left and to the right. If every word bounding box has rulings above, below, to the left and right of it and there are two columns, it is concluded that the table is fully lined and use the rulings as delimiters of the cells. That is, a cell frame is calculated as the closest x and y coordinates of rulings in each of the four directions. Finally, cells with identical frames are merged 17 together so that the final cell with a given frame has all the word bounding boxes of all the cells with that frame. The result is a list of cells with the word bounding boxes for each cell in the table image and the ruled frame coordinates that match up closely with those of the original image. If the table is detected as fully lined, the cell information is returned 18. FIG. 8 shows the result of this operation on the table in FIG. 3. The ruled frames are drawn around each cell. The word bounding boxes are shown around the recognized text which is displayed in a different font than the original.

Step 4. If the table is not fully lined, rows of the table are determined. This is done using a histogram procedure known in the art. Each word bounding box is projected against the vertical axis. Thus the count Hist[y] at coordinate y is the tally of the number of word bounding boxes whose vertical extent overlaps y, i.e., the number of word bounding boxes such that top<=y<=bottom. Horizontal ruling information is used as well. For each horizontal ruling, the histogram is set to zero at the rulings' y-coordinate. The resultant histogram displays peaks and valleys corresponding to rows and gutters. If the count Hist[y] is 0 or 1, it is concluded that there is no row there, and there is a row otherwise. A list of intervals is calculated showing where the histogram exceeds 1. These intervals, in y-coordinates, form the first estimate of the row structure.

Step 5. Merge close cells. Since determining column structure with histogram procedure is preferable, spurious columns should be avoided. Thus, cells are merged 17 that overlap significantly in the vertical direction and are close horizontally. Close horizontally means within 1.5 mm. Close vertically means that there is significant vertical overlap. In particular, if the left cell top coordinate is l.top, the left cell bottom coordinate is l.bottom, the right cell top coordinate is r.top and the right cell bottom coordinate is r.bottom, then the left and right cells are vertically close if 2*(MIN (l.bottom, r.bottom)−MAX(l.top, r.top)+1)>MIN(l.bottom−l.top, r.bottom−r.top).

Step 6. Make a first estimate of columns by projecting the cells vertically onto a horizontal axis 17. The procedure is similar to that for rows with a modification. In the row-finding procedure, each cell is tallied as one. Here, the word bounding boxes are weighted according to their height in the table. If a cell top is within 6.4 mm of the top of the estimated table frame, it is counted as one, but otherwise it is counted at two. This is because cells at the top might be headers and span columns. As with rows, vertical rulings automatically delimit columns, whether they extend the height of the table or not. A list of intervals showing where the histogram exceeds one is calculated. Sometimes spurious columns are produced. To correct that, columns that are within 1.5 mm are merged 17, but not across a vertical ruling.

Step 7. Merge cells within columns and re-computes the columns using these more reliable cell estimates 17. If the x-midpoints of two cells are both within the same column, the two cells are deemed to be within the same column and are merged. After merging, the columns are estimated exactly as in step six using the updated cells.

Step 8. Assign cells to rows and columns if possible 17. The cell data structure has row and column substructures containing its row and column assignment, if any. A cell is assigned to a column with which it has relative horizontal maximum overlap, relative horizontal overlap being defined as the horizontal overlap of column and cell divided by the width of the column. Maximum relative vertical overlap is used to assign cells to rows. It is possible that a cell is assigned to neither at this point. If it happens after this initial assignment that a cell is assigned to a column, but not a row, it is assigned to the closest row above it. If a cell is assigned to a row, but not a column and if it is in the first row, a new column is made for it whose left edge is the left point of the cell and right edge is the right point of the cell, and the cell is assigned to it. Chances are, if it is in the first row, it is a column heading, but there is nothing in the column.

Step 9. Merge cells who share the same row and column assignments 17. Merging two cells means that their word bounding box lists are concatenated and the resulting cell frame is the maximum of bounding box of the two cell frames. This merging is done frequently to consolidate the work done so far. Merging always uses ruling information. Under no circumstances are cells merged that are separated by rules.

Step 10. Headers are identified and labeled 17. Headers are any cells in the first rows that span at least two columns. Header identification is delayed until this point because now the column information is reliable.

Step 11. Merge rows according to table styles 17. There are several specific and popular table styles to consider. These are dealt with by several rules in this step. If there are more that three rows and the top two rows are within 1.5 mm, do the following. If each column has a cell in the second row, but not every column has a cell entry in the first row, merge every cell in the first row that is not a header with the cell in the same column in the second row. Next, tables often have labels in the first column. If a row, not being the first row, does not have a cell in the first column and the nearest row above it is within 5 mm, merge that row to the closest one above it, taking care to never combine cells or rows across rulings. Finally, if a cell in the first column has no other cells in its row, merge that cell to the one below it.

Step 12. A column heading style is treated in which the headings are separated from the columns by rules 17. For example, see FIG. 2. Headings are sandwiched between two rulings at the top of the table. If the first two or three rows are sandwiched between rulings, cells within the same columns in these rows are merged.

Step 13. The rows are re-estimated 17 using these final cell estimates. However at this stage all the small word bounding boxes have been merged into larger cells. Thus rows correspond to intervals where the histogram is positive, rather than greater than one as before.

Step 14. The table frame is estimated as the bounding box of all the cells and rulings found so far 17.

Step 15. To produce cell separators 17, the midpoint of gaps between columns are converted to vertical rulings and likewise for rows. Also, the estimated frame is stored as two vertical rulings and two horizontal rulings. The entire collection of rulings is used to estimate the final vertical and horizontal separators. If vertical two rulings are close together horizontally (within 4.5 mm) and they overlap vertically, they are combined. If one was found is a true ruling from the original ruling list and the other is estimated from a column gap, the true ruling is considered primary and is retained, while the other ruling is removed from the separator list. If two rulings are both true rulings, their x-coordinates are averaged, and the resultant ruling has vertical extent the maximum of the two. Horizontal separators are estimated similarly except that close in the vertical direction is taken to be 1.5 mm.

Step 16. Expand the cell frames to fit within the closest vertical and horizontal separators 17. Cells with the same frame are merged and then returned to the page recomposition for further processing 18.

While the previous steps 1–16, described above are a preferred embodiment of the invention, it should be noted that these steps do not necessarily have to occur in the exact order presented. The skilled will appreciate from the above teaching that some steps may be taken out of order in the above-described method without affecting its functionality and utility.

EXAMPLE

Referring to FIG. 9, the result of the cell identification on the line-less table in FIG. 1 is shown. The cell frames are drawn in but they are invisible. The word bounding boxes corresponding to the word images circumscribe recognized text displayed in a different form (which is why the text runs extends beyond the table frame in this rendition). The analysis makes a mistake by joining the left three column headings.

Now, referring to FIG. 10, a table from a financial report that was cropped out by hand is shown. This table is semi-lined because of the ruling at the bottom, which may or may not be considered by the system or user as part of the table. The short rulings are filtered out as underlines.

The resulting analysis using the present invention is shown in FIG. 11. The characters are outputs from the recognition engine. The rectangle around words show the word-bounding boxes that were used to estimate the cells. All the row and column breaks were estimated using the procedures outlined above. The frames of each cell is drawn in, although all but the bottom ruling are invisible. The analysis correctly groups logical components together into cells based upon word bounding box geometry and several heuristic rules.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A method of identifying, during page recomposition, cells in a table scanned by optical character scanning means as part of an optical character recognition process, comprising the steps of:

segmenting said table into tabular region of rows and columns of individual cells;

merging individual cells which share the same row and column;

determining a plurality of vertical and horizontal rulings;

combining adjacent vertical and horizontal rulings to form vertical and horizontal frames;

merging cells which share the same horizontal and vertical frame expanding cells to fit within the nearest vertical and horizontal frame; and returning said table to the page recomposition process.

2. A method as defined in claim 1, wherein said step of combining vertical rulings further comprises the step of combining vertical rulings which are within 4.5 mm horizontally and which overlap vertically to form vertical frames.

3. A method as defined in claim 1 wherein said step of combining horizontal rulings further comprises the step of combining horizontal rulings which are within 1.5 mm vertically and which overlap horizontally to form horizontal frames.

4. A method as defined in claim 1 wherein said step of determining vertical rulings comprises the step of determining midpoints of the gaps between said columns to form the vertical rulings.

5. A method as defined in claim 1 wherein said step of determining horizontal rulings comprises the step of determining midpoints of gaps between said rows to form the horizontal rulings.

6. A method of identifying, during page recomposition, cells in a table scanned by optical character scanning means as part of an optical character recognition process, comprising the steps of:

segmenting said table into tabular region of rows and columns of individual cells of words;

merging cells of individual words which share the same row and column;

determining midpoints of gaps between said columns to form vertical rulings;

determining midpoints of gaps between said rows to form horizontal rulings;

combining vertical rulings which are within 4.5 mm horizontally and which overlap vertically to form vertical frames;

combining horizontal rulings which are within 1.5 mm vertically and which overlap horizontally to form horizontal frames;

merging cells which share the same horizontal and vertical frame expanding cells to fit within the nearest vertical and horizontal frame; and returning said table to the page recomposition process.

7. A method as defined in claim 6 wherein said cell comprises a data structure consisting of a pointer to a linked list of individual cell's, frame coordinates, and coordinates of said cell's column and row location in said tabular region.

8. A method as defined in claim 6 wherein a skew correction is applied to said merged cells using a skew estimate to determine a y-offset for each y-coordinate to correct its skew.

9. A method as defined in claim 6 wherein cells are deemed to be in the same column by determining if midpoints of two cells are both within the same column.

* * * * *